United States Patent
Jochijms et al.

[11] Patent Number: 5,907,564
[45] Date of Patent: May 25, 1999

[54] REVERSIBLE MULTITRACK MAGNETIC TAPE STORAGE SYSTEM WITH MULTIFRAME ERROR PROTECTION FACILITY

[75] Inventors: Paulus A. E. Jochijms; Aernout J. Nieuwkerk, both of Eindhoven, Netherlands

[73] Assignee: U.S. Philips Corporation, New York, N.Y.

[21] Appl. No.: 08/679,026

[22] Filed: Jul. 12, 1996

[30] Foreign Application Priority Data

Jul. 19, 1995 [EP] European Pat. Off. .............. 95201981

[51] Int. Cl.$^6$ .................................................. H03M 13/00
[52] U.S. Cl. .......................... 371/37.5; 371/37.4; 371/30; 395/182.04
[58] Field of Search ................................. 371/37.4, 37.5, 371/30, 37.7, 38.1, 39.1; 395/182.04

[56] References Cited

U.S. PATENT DOCUMENTS

| | | | |
|---|---|---|---|
| 4,802,152 | 1/1989 | Markvoort et al. | 369/32 |
| 4,899,232 | 2/1990 | Odaka et al. | 360/48 |
| 5,461,486 | 10/1995 | Uchida | 386/81 |
| 5,467,360 | 11/1995 | Lokhoff | 371/37.4 |
| 5,517,484 | 5/1996 | Takagi et al. | 369/275.3 |
| 5,627,935 | 5/1997 | Kim | 386/81 |
| 5,646,806 | 7/1997 | Griffith et al. | 360/130.22 |
| 5,696,774 | 12/1997 | Inoue et al. | 371/37.4 |

*Primary Examiner*—Reba I. Elmore
*Assistant Examiner*—McDieunel Marc
*Attorney, Agent, or Firm*—Leroy Eason

[57] ABSTRACT

A data storage system having a plurality of parallel magnetic tape tracks. Error protection is based on a frame-wise product code having first code words distributed over a single track and second code words distributed cyclically among all tracks. In a read mode the system drives the tape in a first closed servo loop synchronized by the data rate, and in a write mode in a second open loop operating at a preset tape speed. The tape driver has a bidirectional buffer for framewise buffering data between the tape and an output, while interchangeably presenting either an amble frame (synchronizing patterns) or a data frame to the tape. The system enables handling of data framewise bidirectionally by the tape driver. A third layer of error protection is provided by a Reed-Solomon code operating on a uniform symbol series across a plurality of successive frames without reference to the amble frames, and assignment of all redundant symbols thereby produced to exclusive-redundancy frames.

5 Claims, 4 Drawing Sheets

| D0 | D1 | A | A | D2 | D3 | D4 | A | A | D5 | D6 | D7 | D8 | D9 | P0 | P1 |

REVERSIBLE MULTITRACK MAGNETIC TAPE STORAGE SYSTEM WITH MULTIFRAME ERROR PROTECTION FACILITY

BACKGROUND OF THE INVENTION

The invention relates to a system for reversibly storing digital data on a plurality of parallel and uniform magnetic tape tracks under execution of a frame-based error protection encoding operation embodied in a product code that has first code words each defined in a single track and second code words defined in a recurrent cycle around all of said plurality of tracks. Such a system has been disclosed in European Patent Application EP A1 437 865, corresponding to now issued U.S. Pat. No. 5,467,360 (PHN 13213) assigned to the same assignee, and herein incorporated by reference. The reference relates to the Philips Digital Compact Cassette (DCC) system for digital magnetic tape recording, which is intended for high quality audio at about 16 bits per sample. Magnetic tape is extremely suitable for many purposes for reason of its facility by reversible recording, and would be an advantageous vehicle for data and program recording in an environment of personal computers, multimedia applications, education, and various others. In consequence, a need has started to be felt to upgrade the DCC format for applicability in those environments that impose extremely strict standards as regards reliability on various levels.

SUMMARY OF THE INVENTION

Now accordingly, amongst other things, it is an object of the present invention to provide the known DCC format with an improved error protection facility on a multiframe level that provides error correctability of up to two successive frames at the price of only a moderate error protection overhead, whilst also allowing arbitrary flexibility in selecting between non-contiguous recording sequences on a frame by frame basis. Thereto, according to one of its aspects, the invention is characterized in that said system has tape driver means which in a tape reading mode drives the tape in a first closed servo loop under control of a data handling synchronizer mechanism, and in a tape writing mode drives the tape in a second closed loop under control of a motor feedback mechanism. The tape driver means has bidirectional buffer means for framewise buffering data intermediately between said tape and an application system, whilst in the tape writing mode interchangeably presenting either an amble frame from an amble frame generator or a data frame from said buffer means to said tape.

The system has application means for framewise bidirectional data handling viz a viz said tape driver means, whilst in said tape writing mode activating encoding means for frame-wise error protecting by means, of a Reed-Solomon code that operates on a plurality of uniform symbol series across a plurality of successive frames without reference to amble frames, through assigning all redundant symbols produced by said encoding means to exclusive-redundancy frames.

It has been found that the extra error protection is an effective countermeasure against rare but serious framesize errors that sometimes occur. Such errors can be caused by mechanical malfunctioning that results in multiple error bursts with a high percentage of the data being interfered with. However, it has been found experimentally that generally no more than two successive frames will be affected in this way. The combination of the third layer error protection code with the ignoring thereby of the amble frames provides a powerful and straightforward error protection.

Advantageously, the system has first decoder means for decoding said frame-based product code and for outputting so-decoded correct frames, characterized by detection means for detecting insufficiency of said first decoder means and thereupon activating secondary decoder means for decoding said exclusive-redundancy frames as well as said Reed-Solomon code across said series of frames. This necessitates the executing of the third layer of error protection only when necessary, thereby keeping processor load low.

Advantageously, the system has second detector means for, as based on an undecoded frame therefor, anticipating said insufficiency. In certain situations, a data frame can be interfered with to such degree that decoding thereof is doomed to fail. One way of detecting could be the counting of non-zero syndromes. Although this is not full-proof, generally the occurrence of too many non-zero syndromes indicates that the frame on its own would be beyond repair, so that the third layer of error protection is necessary. Other ways of detecting such a bad amount of data have been disclosed in the art.

The invention also relates to an encoding device and to a decoding device, respectively, for use in such a storage system, and to a medium for use with such system and/or encoding or decoding device. In particular the medium, through its data format, allows to straightforwardly synchronize the data handling to the tape speed and vice versa. Further advantageous aspects of the invention are pointed out hereinafter.

BRIEF DESCRIPTION OF THE DRAWING

These and other aspects and advantages of the invention will be discussed with reference to preferred embodiments described more in detail hereinafter, and in particular with reference to the appended Figures wherein.

DESCRIPTION OF ERROR PROTECTION CODE FORMAT

Figure 1:
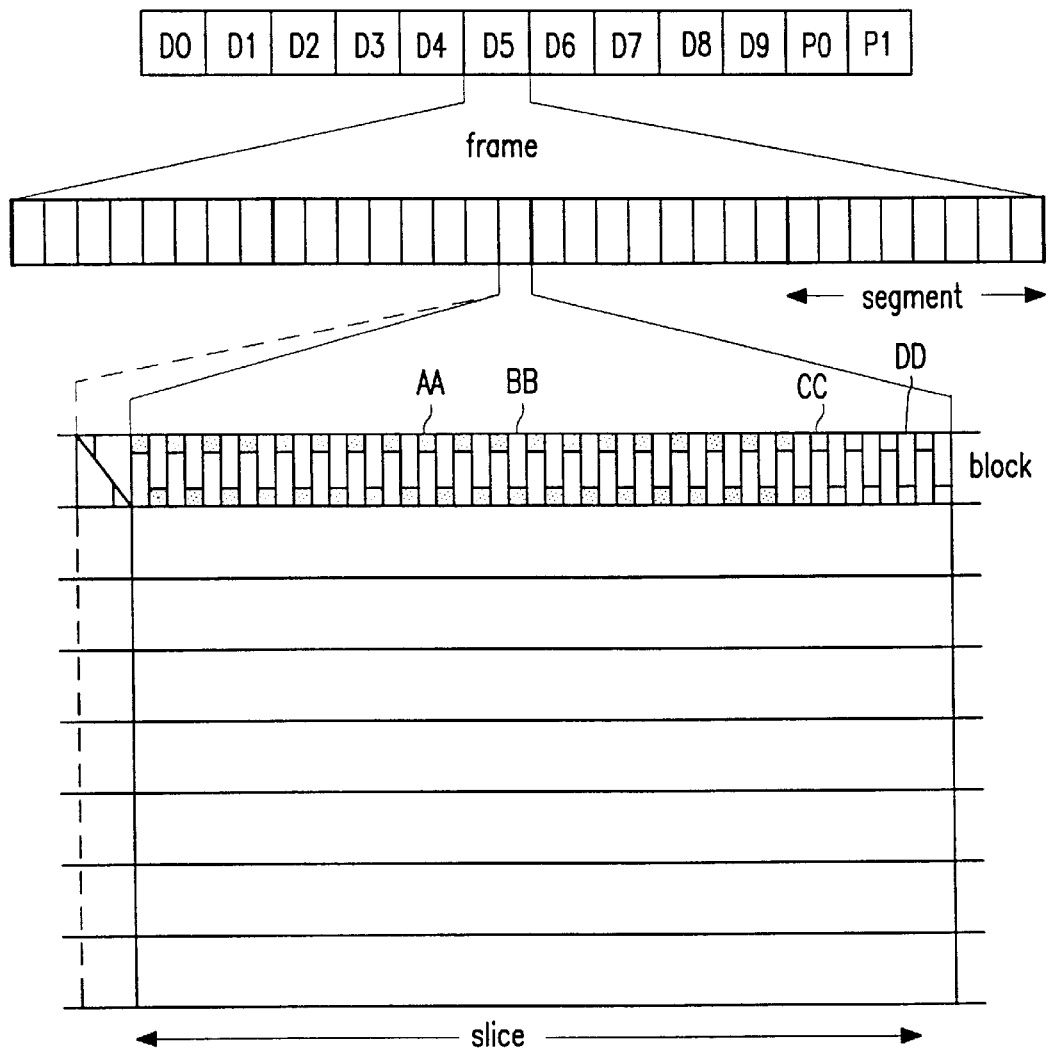
FIG. 1 is an overall schematic of the error protection format.

FIG. 1 shows an overall schematic of the error protection format according to the invention. Therefore, the top row symbolizes a stretch of an eight-track tape that has a sequence of ten data frames D0–D9, followed by two parity frames P0, P1. The next row shows an exploded view of a single frame, in this example frame D5. The frame in question is built up from a sequence of four segments, wherein each segment is built up from a sequence of eight blocks. The third row shows an exploded view of a single block that in this Figure goes unnumbered. As shown, the block covers all eight tracks in parallel. The part of the block situated in the topmost tape track has been detailed on the symbol level. At the beginning of a block at left, there are three system symbols. First comes a synchronization symbol of 10 channel bits that has no counterpart in the data processing, inasmuch as it has no information content apart from signalling the start of a block. The second symbol is the combined number of block and track with a range of 0–255; within a single frame it is unique for each block. The third symbol is a parity symbol that is, unrelated to the present invention. For on-tape storage, each eight bit information symbol, including the above number and the parity symbol, is modulated into a channel symbols of ten bits. In this way, so-called d,k constraints can be fulfilled, while also keeping direct-current portions in the stored signal to a minimum. The remaining 48 symbols are assigned to 2-interleaved C1 code words of a (n,k,d)=(24,20,5) Reed-Solomon code: symbols belong alternatingly to the first and to the second C1 code word as has been symbolized by their alternating asymmetric representation. Thus, information symbol AA and parity symbol CC belong to the first code word, information symbol BB and parity symbol DD to the second code word of this track. The parity symbols are positioned at the right end (i.e. later in time during standard replay) and have a different representation in the Figure. All tracks shown have a uniform format.

Figure 2:
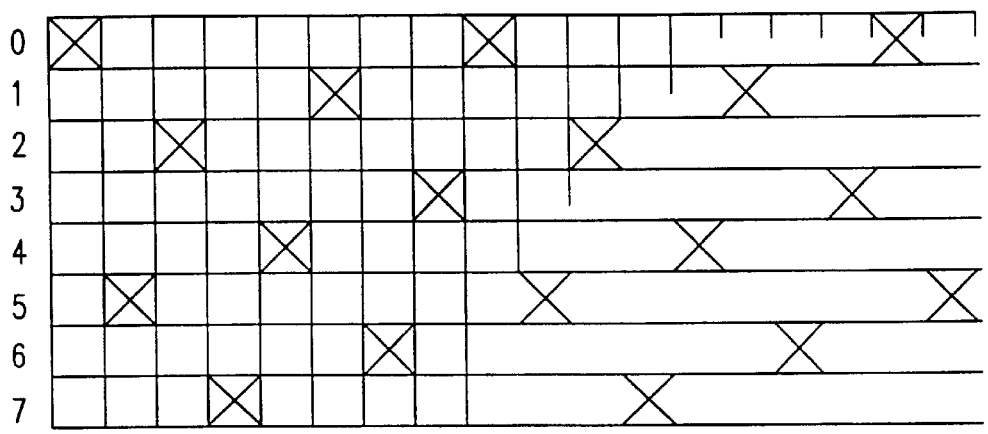
FIG. 2 is a brief schematic of the C2 error protection format.

FIG. 2 briefly indicates a schematic of the C2 error protection format. The C2 code words pertain to a (n,k,d)=(32,26,7) Reed-Solomon code. Each word is disposed within a single frame, and is distributed uniformly over the associated blocks: each block has one symbol of any particular C2 code word. For attaining the best possible separation among symbols of any single C2 code word, contiguous symbols within a particular C2 code word have gotten an across-tape incremental offset of five tracks, the tracks being notionally positioned along a tube. Mathematically this can be expressed as an offset that is calculated modulo the number of tracks. Successive track numbers of a single C2 code word may be for example: 1, 6, 3, 8, 5, 2, 7, 4, 1 . . . . In FIG. 2, the assignment of the symbols to respective tracks has been indicated by a cross drawn in the space assigned to a whole associated block: each block is represented by a column of small squares.

Figures 3, 4:
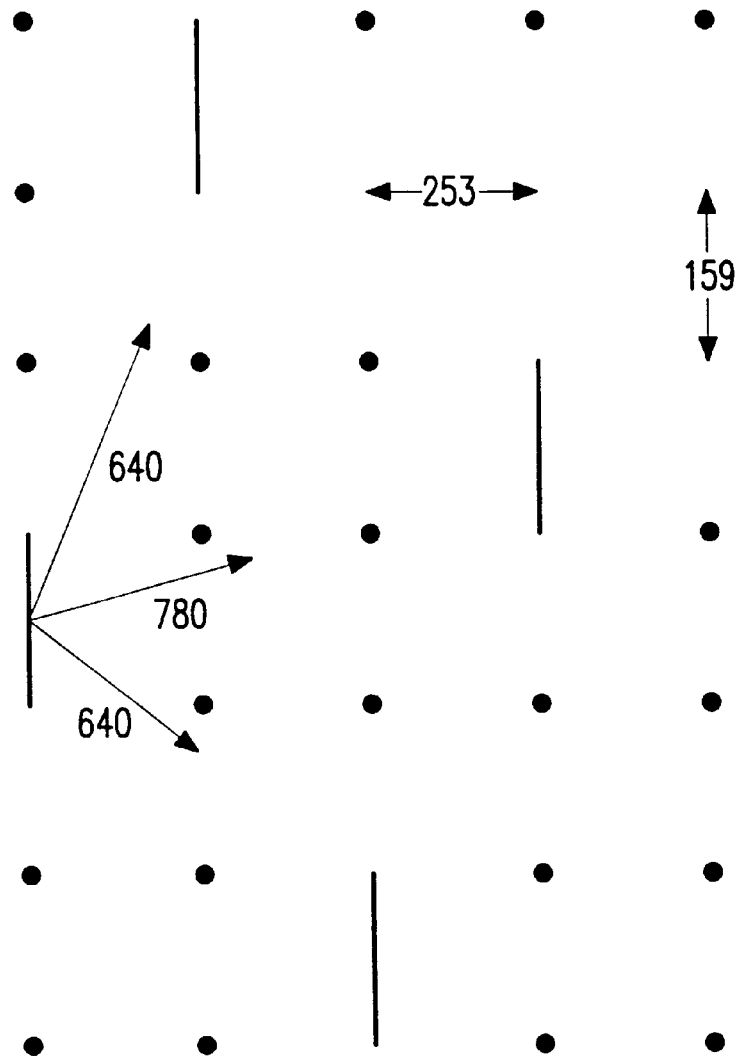
FIG. 3 shows a geometrically conforming schematic of a C2 word.
FIG. 4 shows the usage of so-called amble frames.

FIG. 3 is a geometrically conforming schematic of a C2 word. The dots indicate a reference position pertaining to a particular symbol. Horizontal rows of dots are on a single track. Vertical rows of dots pertain to a single block; their horizontal spacing is one block length. Due to the generally known properties of magnetic recording, a symbol is substantially as wide as a track. Therefore, the area covered by a single symbol is relatively much wider than long: this width is slightly less than the track width of 195 microns. The Figure shows a few symbols of a single C2 code word. As far as shown, the symbol in the next column is the next symbol of the single C2 word in question. Due to the across-track jump between contiguous symbols of a single C2 code word, the distance between geometrically nearest symbols is substantially uniform in the various possible directions, wherein the notion of "substantially" is on the level of the physical size of the symbol itself. These respective distances are equal to 640 microns and 780 microns, respectively as shown, and are measured from the centre of gravity of the symbol in question. The length of a block is 253 microns.

In FIG. 1, the format encompasses a third layer error protection for highest performance. In this format, the protection is realized as a Reed-Solomon code with (n,k,d)=(12,10,3) code words, defined over ten logically successive frames D0–D9, P0–P1 as shown. Each code word of the latter code has one symbol in each of the twelve frames at uniform positions, the parity symbols being positioned in the P0, P1 frames. The error protectivity of this system is two arbitrary frames if frame-wise erasure pointers have been provided, or one arbitrary frame if no such frame-wise pointer has been provided. In practice, the most frequent occurrence of failure of the first two layers of error protection is only up to at most two successive frames that have interference through mechanical influences, such as a capstan nonconformity or a tape fold. In principle, distributed symbol errors in more than two frames within a string of ten frames could also be mended by this third layer error protectivity, but in the preferred embodiment such is relegated to the error protection by the C1 and C2 code words. Also, although error correction of a single frame without the assistance through framewise erasure pointers can be coped with, this possibility is considered an extremely improbable one. This means that the third layer or C3 error protection will only be called for in exceptional circumstances. In doing so, the reconstruction of just one single frame of twelve frames so logically linked is extremely straightforward in that the first redundant symbol of the Reed-Solomon code is generated by simple parity. In principle, the code words of the third layer may have any other length than twelve symbols.

FIG. 4 illustrates the usage of so-called amble frames. Amble frames have no relevance for the inputting or outputting of stored data, and contain magnetization patterns that are only relevant for synchronizing the data access mechanism to the tape driving speed. For example, on the level of channel bits the stored magnetization patterns could have uniformly over the frames a magnetic alternation at the maximum recurrence frequency allowable with the (d,k) constraint of the modulation. In the context of the present invention, the amble frames with respect to the C1, C2 codes are treated in the same manner as data frames. The advantage of this policy is that the encoding and decoding hardware of standard DCC machines can be employed. The particular manner of treating the amble frames is then left to the data handling application.

Now, in case of a read operation from tape, the read mechanism of a tape deck derives a speed measurement signal from the successive magnetization changes that occur at prescribed intervals. A closed loop servo mechanism then operates to maintain the physical tape speed at a value that is determined by the data handling speed by the decoder that itself depends on the local clock frequency. On the other hand, in case of a write operation to tape, the tape deck maintains the physical tape speed at a preset value that can be independent of the data handling speed in the encoder. Thus, as regards the data processing mechanism, during writing the servo loop is open, so that the bit length on tape has a value that may show a certain variation. This variation may occur in time as well as from one tape deck to another, the compact cassette itself being designed for easy exchangeability. In FIG. 4, the tape format has been shown in similar manner as in the top row of FIG. 1, each block corresponding to one tape frame, and the total number of frames relating to a single C3 code block. Thus, the Figure again shows standard data frames D0–D9, in addition to redundant frames P0, P1. Furthermore four amble frames have been shown that are each labelled as A.

The usage of amble frames has two reasons. The first reason is that during data generation for recording, the data production speed by the production process cannot always keep pace with the data absorption capacity of the tape storage as measured in bits per second. Naturally, a data buffer is provided at the data source for intermediately storing the data between production (or reception) and storage. If during writing the buffer filling degree falls below a certain level, the application mechanism will forego providing data to the tape driver mechanism for storing during one or more tape frame intervals, and will output a signal pertaining to an amble frame. This will be encoded in the tape driver mechanism as if it contained good data. In the meantime, the buffer is expected to fill again to an appropriate level. Of course, if the data generating process really stops, the tape motion may be halted as well. However, such halting is never instantaneous through mechanical inertia, and this means that halting and starting again of the tape, and possibly also effecting a reverse motion, may take a time interval of many milliseconds. If in the reverse case, the application mechanism would generate more data than the tape storage mechanism can absorb, the data generating must halt. This however, is assumed to be controllable on a very small time scale.

The second reason for generating amble frames is that writing, which is always effected on the basis of one or more whole frames, only starts after the tape driver system has read a sequence of already stored frames. At the transition from reading to writing at the end of the last prestored frame, this causes the transition from closed loop control to open loop control discussed supra. The requirement for tight storing of the frames then mandates that the next frame must have a so-called seamless append to its predecessor, so that there would be no unmanageable synchronizing jump. In fact, the new frame could result from overwriting an earlier frame, so that the available space is the same as available for writing in a continuous sequence of frames. The transition from closed-loop to open loop control may cause a change in tape driving speed, however small that change may be. The inventors have found that providing two successive amble frames is always sufficient for effecting a smooth and faultless transition. For writing a continuous sequence of frames, the two amble frames need only be written at the beginning of the sequence, provided that the data production speed equals the absorption speed by the tape. In other environments, a different number of amble frames from that shown in FIG. 4 could be the right solution.

DESCRIPTION OF THE DECODING PROCESS

Figure 5:
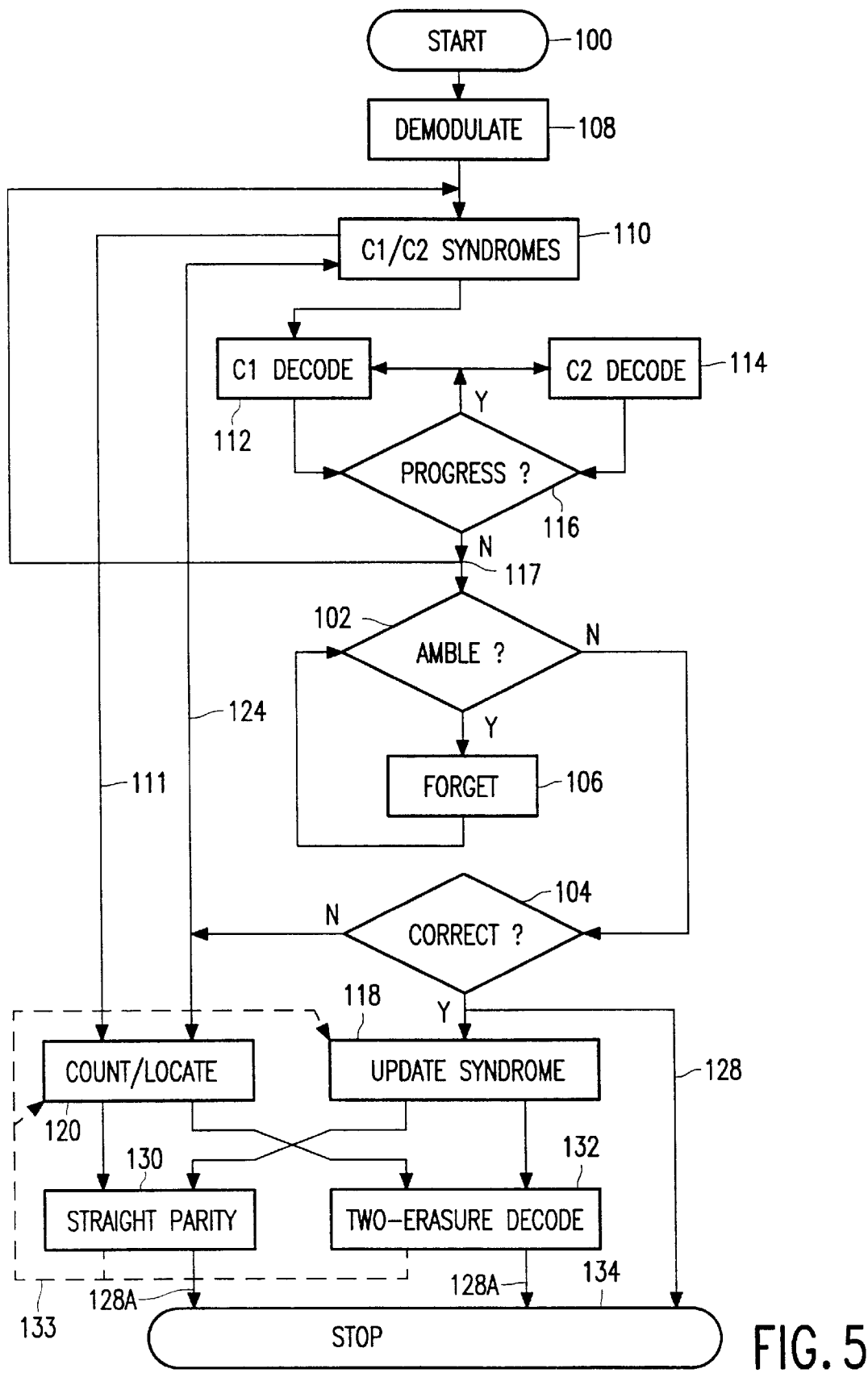
FIG. 5 is a flowchart for a decoding operation.

FIG. 5 is an exemplary flowchart for a decoding operation. The organization has been shown as a plurality of cooperating processes that operate in a serial organization. Upon the succinct disclosure hereinafter, the mapping thereof on standard or special purpose hardware is deemed straightforward. Block 100 represents the input of the system that receives the bitstream from tape. In block 108, a frame is symbolwise demodulated. Block 110 is the first block of the C1/C2 Reed-Solomon decoding. For simplicity, no symbol-wise erasure flags from the demodulation have been considered.

First, block 110 calculates the Reed-Solomon syndromes through multiplication of the C1, C2 code words with the applicable parity check matrix. Next, separate C1 and C2 decoders interact to realize the decoding of the C1, C2 product code within a frame in blocks 112, 114, respectively. Generally, first as indicated, the C1 code is decoded, which may result in a correct or corrected code word, or in an uncorrectable code word. At this level, certain original or remaining errors may go undetected. Next, the C2 code is decoded, which in principle has the same categories of outcome. The C2 code in many cases corrects errors that were incorrectable for the C1 code. If the system judges that even the C2 decoding can be improved upon, switchback to the C1 decoding may be effected, and vice versa. The final result may be a correct or corrected frame, or alternatively one that still has non-zero syndromes, and in consequence is still faulty; the decision to terminate is advantageously made if no further progress is made (116), or need be made in the correcting process. As long as progress is made or expected to be made, the process may revert to the decoding in blocks 112, 114. When the C1/C2 decoding terminates, the frame is presented to the next processing level at the application mechanism (117) and also enables the decoding of the next frame.

The C1/C2 decoding is preferably part of the tape driver means; the output from block 116 is to the application mechanism. In block 102 the application detects whether the received frame is an amble frame. If yes, in block 106 it is withdrawn from further consideration. This detection is generally feasible even if the error correction of the first and second layers was not fully successful; the information content of an amble frame is sufficiently slight that even a seriously interfered amble frame will reveal its character. Another method for identifying frames as amble frames is based on frame numbering. All frames, inclusive amble frames have an absolute frame number. In addition, exclusively data frames have a logic frame number, in such a manner that both number sequences have uniform increments. Discrepancies between the incrementing of the two sequences will immediately identify an amble frame.

Block 102 therefore outputs a continual stream of data frames. In block 104 these are checked for correctness. Standard procedures for this kind of verification have been developed in the art. For example, the existence of non-zero syndromes after the C1–C2 decoding is a clear indication in this respect. If the frame is correct, in block 118 the syndromes of the C3 code words may be updated; in principle, this also renders the frame in question available to the data application (128) for further utilization outside the present invention.

If the frame is still faulty (detected in block 104), it may be treated as an erasure frame, of which the information is inconsequential. In block 120 the number and position of the erased frames within a series of ten data frames are memorized. Together with this storing in block 120, a signal is sent (124) to the C1/C2 decoding in blocks 110–116 to also decode the two next-occurring parity frames; as long as this signal has not occurred in a sequence of ten information frames, the C1/C2 decoding for the associated two parity frames may be foregone. In another embodiment, all frames are decoded whether data, parity or amble frames. Block 120 also memorizes the total number of data frames that have been received in a sequence of ten such frames. The number of faulty frames in a sequence of ten information frames now controls the decoding process of the third layer. If one, the faulty frame is reproduced by reconstructing any symbol thereof through straight parity recalculation within the associated C3 code word in block 130. If two, in block 132 the two erased frames are recalculated by using the full two-erasure reconstruction facility of the C3 code. If more than two, the faulty frames are signalled as being beyond repair; not shown in the Figure. The reconstructed frames are outputted unto lines 128A in correspondence to the correct frames produced at line 128. This outputting also resets the count in block 120 and the syndromes in block 118, as indicated by a dashed line 133. This resetting also occurs if block 120 counts a sequence of ten correct data frames. A particular feature is present in block 110: if the number of non-zero syndromes for a single frame is too large, the C1/C2 decoding for the frame in question is expected to be unsuccessful, and therefore, the decoding is foregone. This will straightaway produce the signal; 'faulty frame' to the C3 decoding in block 120 on line 111. In similar way, the forwarding of the frame, after C1/C2 decoding proves unsuccessful can be foregone as well, which can be effected by signalling this failure on the connection 117 between blocks 116 and 102. For completeness' sake, a termination block 134 has been shown.

DESCRIPTION OF PREFERRED HARDWARE EMBODIMENTS

Figure 6:
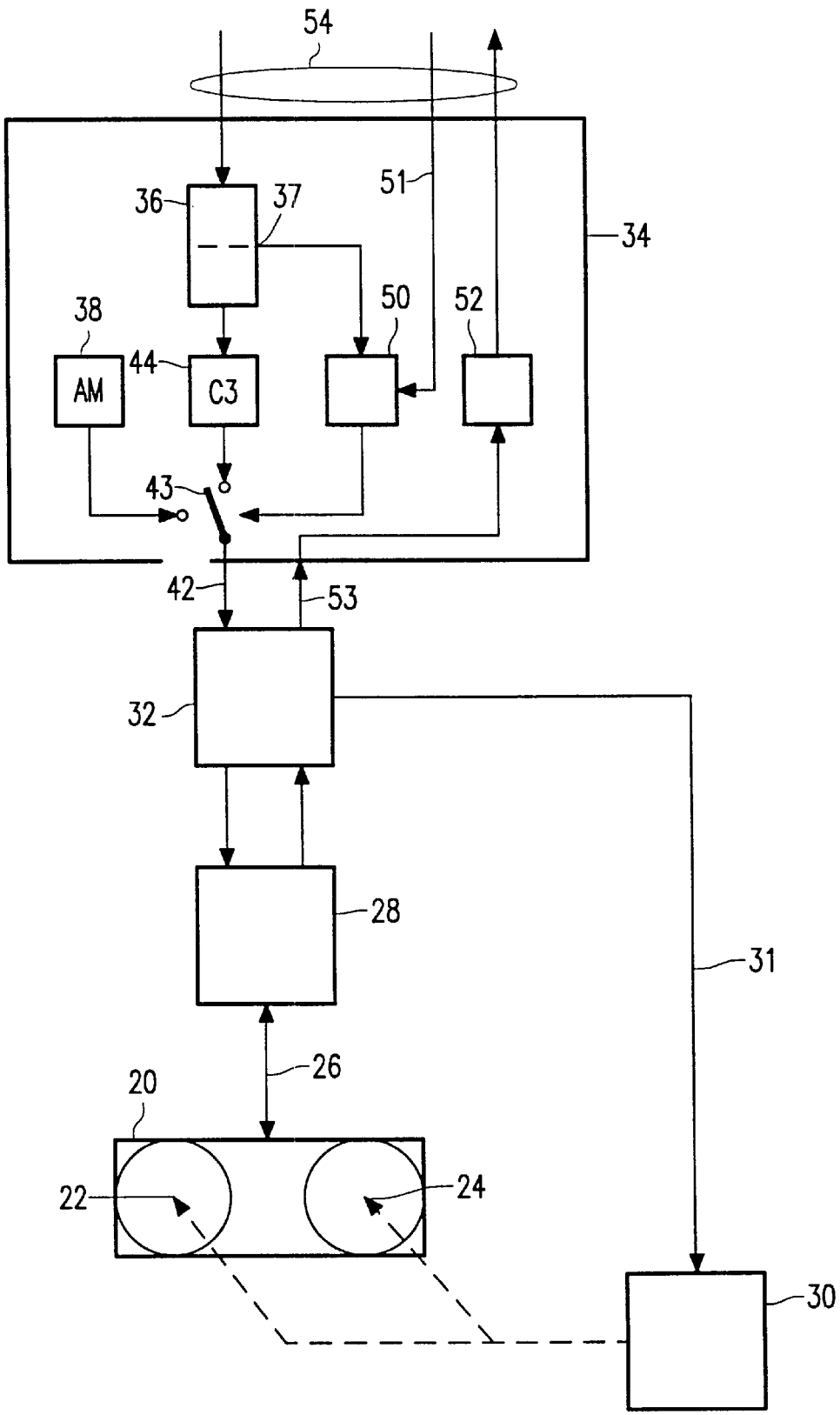
FIG. 6 is a block diagram of a tape deck device.

FIG. 6 is a block diagram of a tape deck device for use with the code format shown in FIGS. 1 to 4. Cassette 20 contains the tape that may be driven from capstan 22 to capstan 24 and vice versa. Arrow 26 symbolizes the read-write head mechanism that in fact accesses eight tracks in parallel. Block 28 represents the eight-fold read-write amplifier. Block 30 is the tape drive mechanism or motor that has two operating modes. In write-to-tape mode, tape speed is largely controlled by the mechanism itself, so that with respect to data transfer the control is open loop. With respect to the motor itself, the control is in closed loop feedback. In read-from-tape mode, control is by the next higher level on line 31 governed by the data handling in tape driver means 32 in closed loop feedback. Line 31 also carries the go-stop, fast-slow, search mode, and forward-reverse signalizations. All these elements have not been detailed further, inasmuch as the invention takes the conventional DCC system for granted. Block 32 is the driver subsystem that interfaces to the tape on the level of a complete frame. It comprises the modulation and demodulation elements, the encoding and decoding mechanisms for the C1 and C2 codes, appropriate bidirectionally operative RAM and processor capacity. Together with the elements recited supra, it may constitute a standard DCC player with digital input and output.

Block 34 represents the application mechanism. For frame encoding it has an amble frame generator 38 that may be multiplexed to output 42 as an alternative to the output of C3 encoder 44 that in turn is fed with the user data. Control of multiplexer switch 43 is by controller 50 through a filling degree signal received on line 48 from filling degree pointer 37 in data buffer 36. In practice, buffer 37 may be situated downstream from encoder 44. If the buffer becomes too empty at the end of the preceding data frame, an amble frame pair is substituted for the next two data frame spaces. In principle, another number than two may apply. If necessary, further amble frames may follow the first two, if the data inflow is too low. If the amble frame count reaches a further threshold, the tape may be halted, followed by reverse motion to an earlier position from which the drive may restart for attaining an appropriate speed at the start of an intended new data frame. In practice, the first two amble frames are effectively stored on tape. Subsequently to providing the first two amble frames, generator 38 will provide further amble frames to fully flush intermediate buffer storage between multiplexer 43 and tape head mechanism 26. These further amble frames will then not necessarily be stored on tape. If after generating the second amble frame onto multiplexer 43 a new data frame is available for storage, the multiplexer will be switched back, so that data is stored again after two amble frames, cf. FIG. 4.

If in the reverse case, the filling of buffer 36 is faster than the storage on tape, the filling degree indicator may signal the data source to temporarily halt processing. This has not been shown.

If the application mechanism changes over from data reading to data writing, after the reading of the last frame a seamless append facility is provided. This also necessitates the writing of two directly successive amble frames on tape before the first data frame can be written. The switchover of multiplexer 43 in that case is controlled upon an I/O command of the application. The necessary connection thereof to controller 50 is via link 51. For reading tape, the data is output on line 53 to decoder 52 that operates according to the principles described with reference to FIG. 5. Appropriate storage space can be provided, that together with buffer 36 can be mapped on common hardware that is bidirectionally operative. Bidirectional datastreams, inclusive of bidirectional control streams can travel on user interface 54, not shown for brevity. This interface may connect to a user machine not shown, and may include read/write selection, controls described for line 31, clock signals, higher level handshake signals and further control signals such as described in earlier U.S. Pat. No. 4,802,152 to the same assignee, that was directed to a drive methodology for read-only CD-ROM.

We claim:

1. A system for reversibly storing digital data on a magnetic tape record carrier having a plurality of parallel recording tracks, frame-based error protection being provided by encoding the data in accordance with a product code having first code words and second code words, the code symbols of each first code word being distributed over a single track and the code symbols of each second code word being cyclically distributed over all of said tracks; said system comprising:

tape drive means having (i) a read mode in which it operates in a first servo loop which is closed and is controlled by a synchronizing signal derived from data read from the record carrier, and (ii) a write mode in which it operates in a second open loop wherein tape speed is maintained at a preset value;

bidirectional buffer means for providing intermediate storage of data frames between said record carrier and an external data source or sink;

an amble frame generator for supplying amble frames, said tape drive means being adapted when in the write mode to selectively convey either an amble frame from said generator or a data frame from said buffer means to said record carrier; and encoding means which, when said tape drive means is in the write mode, is actuated to provide frame-wise error protection by encoding in accordance with a Reed-Solomon code applied to a plurality of uniform series of symbols across a plurality of successive data frames without taking account of amble frames, the encoded symbols which are thereby produced being assigned to exclusive-redundancy frames.

2. A system as claimed in claim 1, further comprising first decoder means for decoding said frame-based product code and outputting so-decoded correct frames, detection means for detecting insufficiency of said first decoder means to output all correct decoded frames, and second decoder means actuated by said detection means to decode said exclusive-redundancy frames as well as said Reed-Solomon code across said plurality of successive data frames.

3. A system as claimed in claim 2, further comprising second detection means for detecting an undecoded frame and based thereon anticipating said insufficiency of said first decoder means.

4. A decoding device for use as the decoder means in a system as claimed in claim 2.

5. An encoding device for use as the encoding means in a system as claimed in claim 1.

* * * * *